(12) United States Patent
Zambon et al.

(10) Patent No.: US 10,951,307 B1
(45) Date of Patent: Mar. 16, 2021

(54) WINDOW HEATER WITH REDUCED WAVEFRONT DISTORTION

(71) Applicant: EOS Defense Systems USA, Inc., Huntsville, AL (US)

(72) Inventors: Paolo Zambon, Campbell, CA (US); Siegfried Fleischer, Campbell, CA (US)

(73) Assignee: EOS Defense Systems USA, Inc., Huntsville, AL (US)

( * ) Notice: Subject to any disclaimer, the term of this patent is extended or adjusted under 35 U.S.C. 154(b) by 241 days.

(21) Appl. No.: 16/111,197

(22) Filed: Aug. 23, 2018

Related U.S. Application Data

(63) Continuation of application No. 14/448,566, filed on Jul. 31, 2014, now Pat. No. 10,079,640.

(51) Int. Cl.
*H04B 10/11* (2013.01)
*H04B 10/40* (2013.01)
*H05B 3/86* (2006.01)

(52) U.S. Cl.
CPC .............. *H04B 10/11* (2013.01); *H04B 10/40* (2013.01); *H05B 3/86* (2013.01)

(58) Field of Classification Search
CPC ........... H04B 10/11; H04B 10/40; H05B 3/86

USPC ........................................................ 219/522
See application file for complete search history.

(56) References Cited

U.S. PATENT DOCUMENTS

| | | | | |
|---|---|---|---|---|
| 4,845,344 | A * | 7/1989 | Price | B64C 1/1492 219/547 |
| 5,647,840 | A * | 7/1997 | D'Amelio | A61B 1/00091 600/169 |
| 2012/0218632 | A1* | 8/2012 | Dede | G02B 23/16 359/399 |

\* cited by examiner

*Primary Examiner* — Dana Ross
*Assistant Examiner* — Joseph W Iskra
(74) *Attorney, Agent, or Firm* — Fenwick & West LLP (57) ABSTRACT

An optical communication system includes a free space optical transceiver within a housing to transmit and receive optical communication signals along an optical pathway through a window in the housing. Heating elements applied to the interior surface of the window substantially uniformly heat the window such that the window is kept free from condensation and ice without introducing significant distortions in the wavefront. Accordingly, the heating elements are designed and placed on the window such that the obscuration caused by the presence of the heating elements within the optical pathway and the wavefront distortion caused by temperature gradients within the cross-section of the window in the optical pathway cause less than 1 decibel (dB) in transmission loss as compared to the same system without the heating elements on the window.

19 Claims, 7 Drawing Sheets

WINDOW HEATER WITH REDUCED WAVEFRONT DISTORTION

CROSS REFERENCE TO RELATED APPLICATIONS

This application is a continuation of prior, co-pending U.S. patent application Ser. No. 14/448,566, filed on Jul. 31, 2014, which is incorporated herein by reference in its entirety for all purposes.

BACKGROUND

Field of Disclosure

The present disclosure relates generally to components that heat optical elements used to transmit light, and more specifically to heaters applied to windows of optical communication systems that are installed outdoors.

Description of the Related Art

Optical communication systems that are installed outdoors are subject to the temperature and weather extremes of the geographic locations in which they reside. Although the internal components of the optical communication system may be protected by being enclosed in a weather-proof housing, there needs to be a window on at least one side of the housing to allow the optical communication signal to pass into and/or out of the housing for communication purposes.

Condensation or icing on the window of housing will substantially attenuate the optical communication signal, thus degrading the performance of the optical communication system. To remove condensation and ice from a window, a window heater may be employed. Conventional window heaters, such as those that are embedded in or applied to the surface of car windows, result in uneven heating of the window. If a temperature gradient exists across the area of the window through which the optical beam passes, the temperature gradient creates a wavefront distortion of the optical beam. Thus, the wavefront of light passing through a window with a temperature gradient is distorted, resulting in degradation of the performance of the optical communication system.

SUMMARY

An optical communication system includes a free space optical transceiver within a housing to transmit and receive optical communication signals along an optical pathway through a window in the housing. Heating elements applied to the inside surface of the window substantially uniformly heat the window such that the window is kept free from condensation and ice without introducing significant distortions in the wavefront. Accordingly, the heating elements are designed and placed on the window such that the obscuration caused by the presence of the heating elements within the optical pathway and the wavefront distortion caused by temperature gradients within the cross-section of the window in the optical pathway cause less than 1 decibel (dB) in transmission loss as compared to the same system without the heating elements on the window.

In one embodiment, a round window is equipped with parallel straight-line segments of heating elements connected by arcs at the edges to the adjacent parallel straight-line segments. The pitch between the parallel straight-line segments of heating elements is configured to flatten temperature distribution throughout the window. The pitch decreases with increased distance from the center of the round window. In another embodiment, a round window is equipped with heating elements arranged substantially as concentric rings of different radii, wherein the pitch between the rings of heating elements decreases with increasing radii of the rings.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Figure 1A:
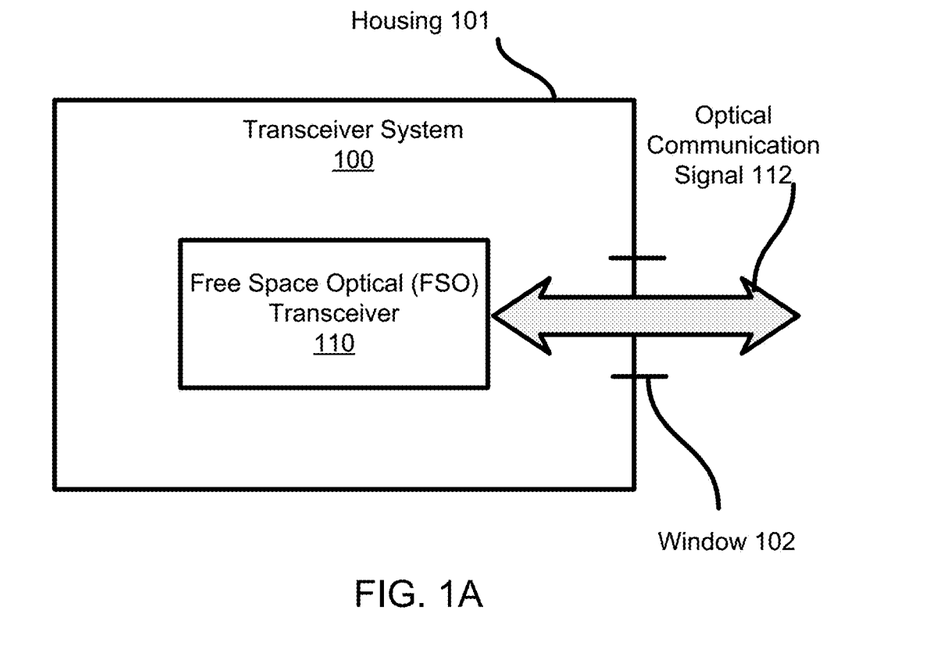
FIG. 1A is a block diagram of a transceiver system that communicates an optical communication signal into and out of a housing through a window, in accordance with an embodiment.

FIG. 1A is a block diagram of a transceiver system 100 installed outdoors. The transceiver system 100 includes a free space optical (FSO) transceiver 110 surrounded by a housing 101. In addition to the FSO transceiver 110, the transceiver system 100 may contain other components, such as a radio frequency (RF) transceiver, positioning components, computing components, and others, which are not pictured here. These components may work together to control the transmission, reception, and processing of data.

Further, these components may be configured to analyze incoming data streams, process data regarding the health, status, and/or operation of the transceiver system 100, and transmit responses to data inquiries.

The FSO transceiver 110 exchanges (i.e., transmits and receives) optical communication signals 112, such as infrared light at 1,550 nanometers or another eye-safe wavelength, from the FSO transceiver 110 to another system that is remote from the transceiver system 100. The FSO transceiver 110 communicates the optical communication signal 112 into and out of the housing 101 through a window 102. Accordingly, the FSO transceiver 110 is within the housing 101 to transmit and receive optical communication signals 112 along an optical pathway through the window 102.

Figure 1B:
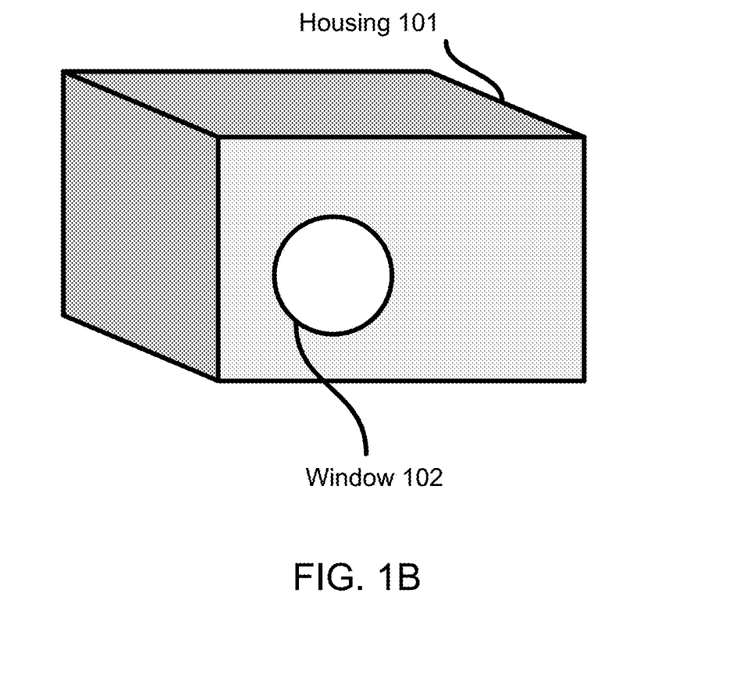
FIG. 1B is a perspective view of the housing and window of the transceiver system illustrated in FIG. 1A, in accordance with an embodiment.

FIG. 1B is a perspective view of the housing 101 and window 102 of the transceiver system 100 illustrated in FIG. 1A, in accordance with an embodiment. The housing 101 is an enclosure surrounding components of the transceiver system 100 to provide protection from precipitation, dust and other particulates, insects and animals, and other hazards to the transceiver system 100 that are present in an outdoor environment. The housing 101 may be opaque on all sides with the exclusion of a transparent window 102 of sufficient size and shape to allow optical communication signals 112 to pass through to and from the FSO transceiver.

The window 102 may be made from glass that does not interfere with the transmission of optical communication signals 112, such as N-BK7 or BOROFLOAT. In one embodiment, the window 102 is round with a radius of approximately 140 mm and a thickness of approximately 10 mm. The window 102 is equipped with heating elements applied to the inside surface of the window (i.e., on the same side of the window as the FSO transceiver so as to protect the heating elements from exposure to weather). The heating elements substantially uniformly heat the window 102 to remove condensation or ice which would otherwise block or distort with the optical communication signals 112. In one implementation, the heating elements are made from a commercially available conductive epoxy, such as C116-20 from CREATIVE MATERIALS of Ayer, Mass. or a similar compound. In other implementations, other conductive inks may be used to fabricate durable heating elements affordably, even at relatively small volumes. Typically, the conductive ink is applied to the window using methods similar to printed electronics to produce elements that have a desired line thickness on the order of magnitude of ten microns and will protrude from the surface of the window 102 on the order of ten microns as well.

Figure 2:
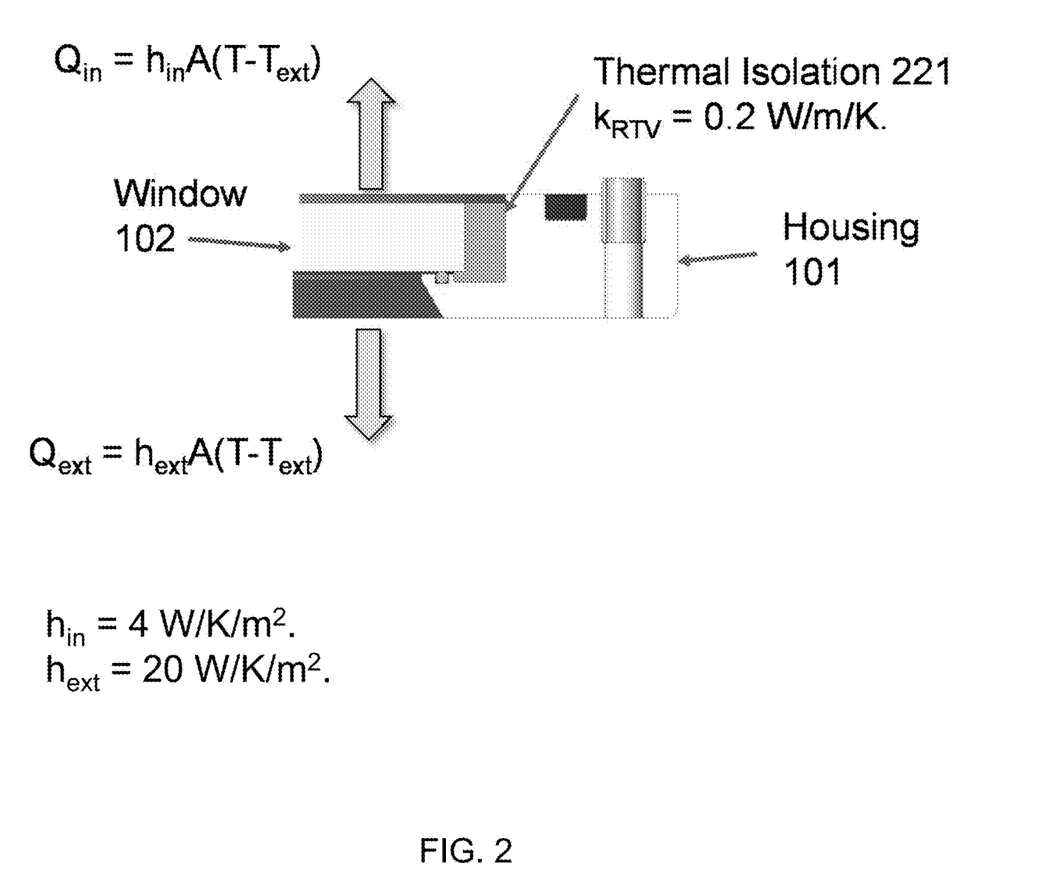
FIG. 2 is an illustration of the boundary conditions used in solving the heat diffusion equation, in accordance with an embodiment.

FIG. 2 is an illustration of the boundary conditions used in solving the heat diffusion equation, in accordance with an embodiment. For purposes of these calculations, the temperature difference between the outside environment and inside of the housing 101 is assumed to be negligible. Further, it is assumed that no thermal exchange occurs through the thin edge of the window 102, because of thermal isolation 221 applied to the thin edge of the window 102, such as RTV silicone, which has a coefficient of thermal conductivity of 0.2 W/m/K. In FIG. 2, all coefficients denoted as $k_{xx}$ are coefficients of thermal conductivity with units of W/K/m. All coefficients denoted as hxx are convective heat transfer coefficients with units of W/K/m². A refers to the area of the window surface, and $Q_{xx}$ is heat exchanged by the window with adjacent regions of space. The heat diffusion equation for this problem is written as:

$$\rho c_p \vec{u} \cdot \Box T = \nabla \cdot (k \nabla T) + Q \qquad \text{Eq. 1}$$

where the equation is defined over a domain contained in three dimensional space; and ρ is the density of the material in kg/m³; $c_p$ is the specific heat or heat capacity at constant pressure in J/kg/K; T is the temperature in Kelvin or degrees Celsius of the window 102 and $T_{ext}$ is the external (environmental) temperature; u is a unit vector perpendicular to the boundary of the domain; and Q describes the heat exchanged by the window that either is generated by the conductive elements in W/m³ or is exchanged with adjacent regions of space. This equation is used to generate the temperature profile of the surface of the window 102.

Figure 3:
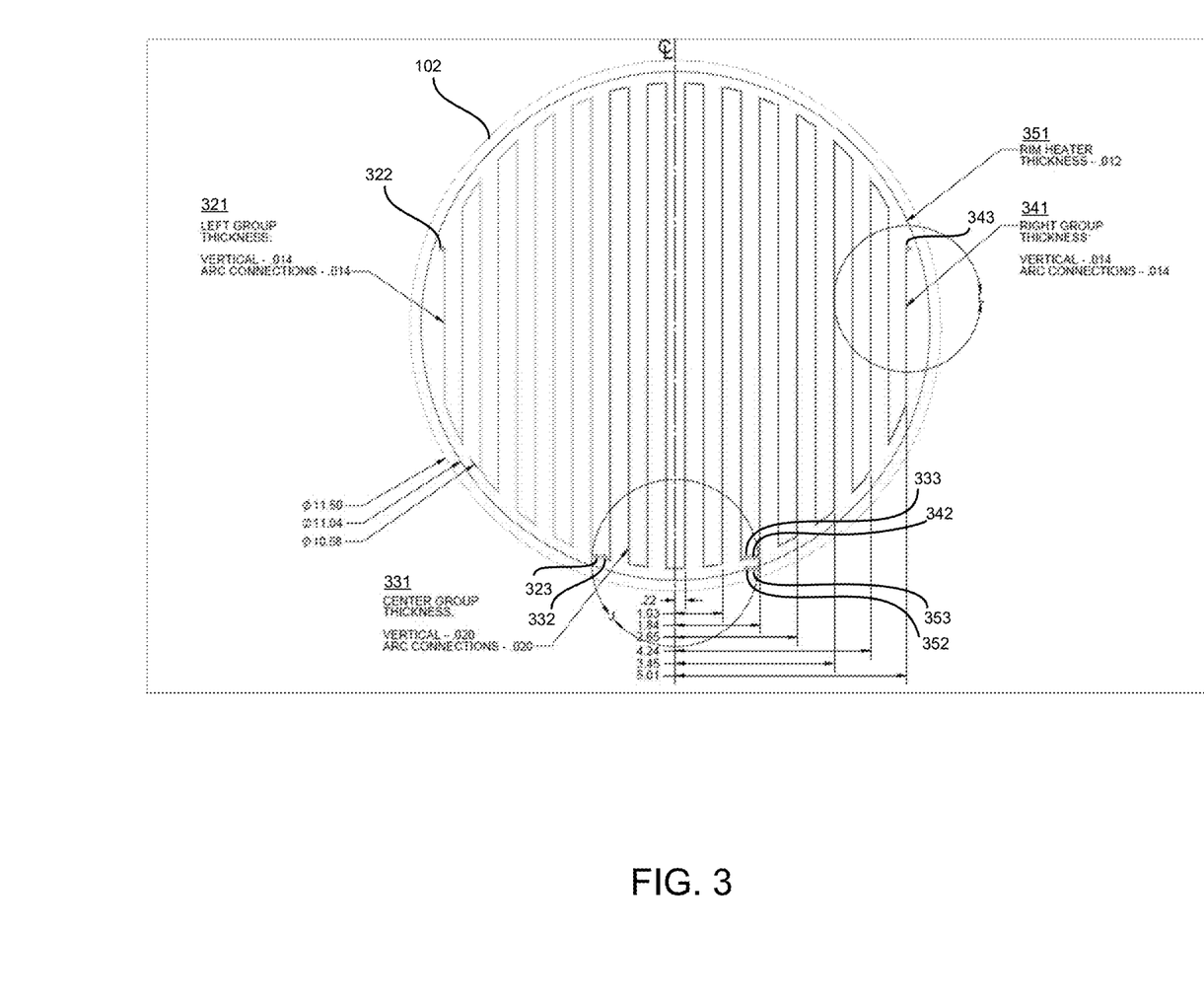
FIG. 3 is an illustration of heating elements applied to a round window with a varying pitch between straight line segments to produce substantially uniform heating of the window, in accordance with an embodiment.

FIG. 3 is an illustration of heating elements applied to the inside of a round window 102 with a varying pitch between straight line segments to produce substantially uniform heating of the window, in accordance with an embodiment. The heating elements illustrated in FIG. 3 include a left group 321, a center group 331, a right group 341, and a rim heater 351. Each of the left group 321, center group 331, and right group 341 includes a set of vertical parallel line segments connected into one contiguous heating element per group by arc segments connecting the parallel line segments at the ends closest to the outer edge of the circular window. The rim heater 351 is a ring-shaped heating element applied near the rim of the window 102. In one embodiment, the rim heater is independently connected to the power supply (not shown). Thus, the rim heater can be independently controlled in order to compensate for uncertainties in the heat transfer between the edge of the window 102 and the housing 101. Each of the left group 321, center group 331, right group 341, and rim heater 351 also includes at each end of the group's contiguous heating element an electrical connector 322/323, 332/333, 342/343, and 352/353 respectively. The electrical connectors 322/323, 332/333, 342/343, and 352/353 are connected to a uniform power source (not shown) supplying, for example, 40 watts of power with a voltage of 48 volts. With these operating parameters, the window heater is designed to function with a minimum outside temperature of −20 degrees Celsius and with wind less than or equal to 9 meters per second. This upper threshold wind speed captures 99% of the weather observations in which outside temperature was at −20 plus or minus 1 degree Celsius.

The thickness of the heating elements in the vertical line segments and arc segments is substantially constant throughout the left group 321 and right group 341 at 0.014 mm. The thickness of the heating element in the vertical line segments and arc segments in the center group is substantially constant at 0.020 mm. Lastly, the rim heater 351 thickness is substantially constant at 0.012 mm. In other implementations, the thickness of the heating elements may vary. The pitch (i.e., the spacing) of the vertical line segments in the left group 321, the center group 331, and the right group 341 varies as a function of the distance from the center of the window 102, as will be described in greater detail below with reference to FIG. 6.

Figure 4:
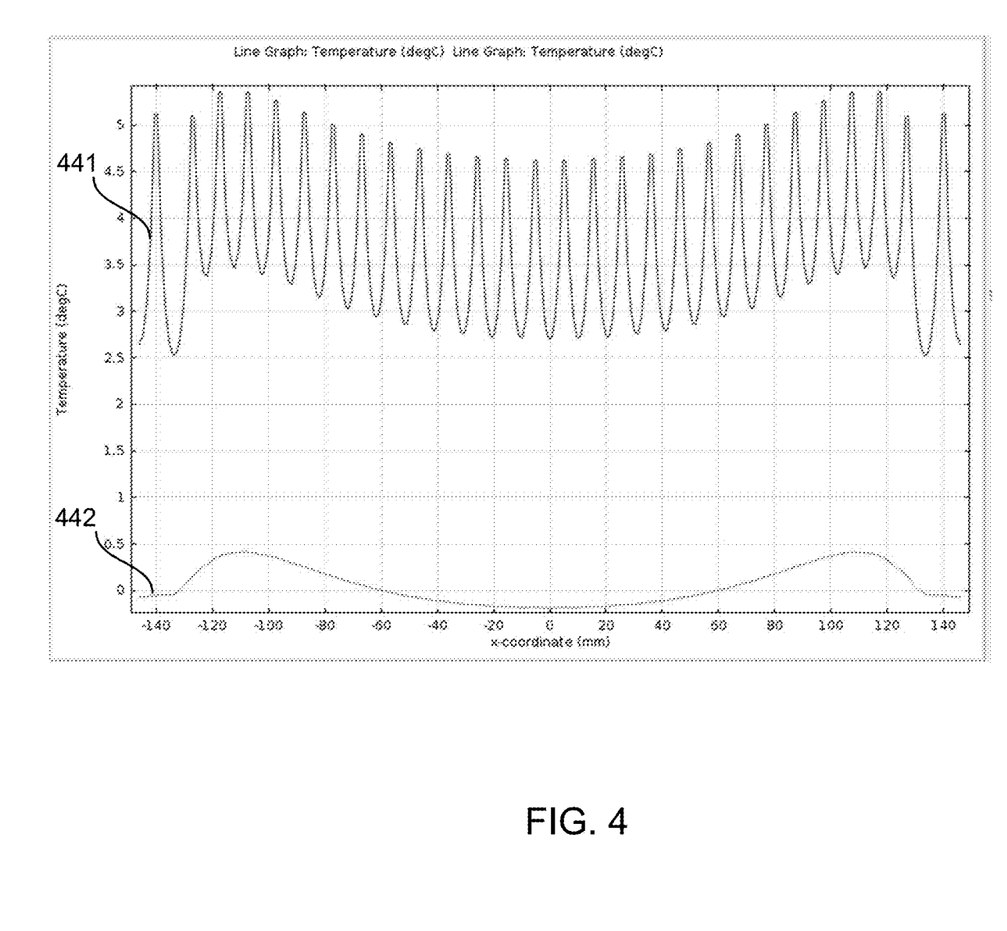
FIG. 4 is a graph of the temperature on the inside of the window and on the outside of the window across the diameter of the window equipped with the heating elements illustrated in FIG. 3, in accordance with an embodiment.

FIG. 4 is a graph of the temperature in degrees Celsius as a function of x-coordinate position across the center of the window 102 equipped with the heating elements illustrated in FIG. 3, along a direction perpendicular to the straight line segments of the heating elements, in accordance with an embodiment. This graph illustrates the uniformity of temperature of the window on both the interior and exterior surface of the window 102. The upper line 441 on the temperature graph corresponds to the interior surface of the window 102, and the lower line 442 on the temperature graph corresponds to the exterior surface of the window 102 (i.e., the opposite side from the side with the heating elements). The peaks in the upper line 441 correspond to the placements of heating elements and the valleys correspond to the positions furthest from the heating elements. The best uniformity of temperature is achieved when the temperature difference illustrated in FIG. 4 between the peaks and valleys is minimized. In this example, the fluctuation is only approximately 2.5 degrees Celsius between the peaks and valleys of the upper line 441 and approximately 0.5 degrees Celsius between the maximum and minimum of the lower line 442. It is noted that it is the temperature variation between the peaks and valleys that creates a grating effect in the pathway of the optical signals passing through the window 102. By minimizing variations in the thermal distribution across the window, wavefront distortions due to grating, lensing, focusing and other similar optical effects that result in transmission loss can be minimized.

Figure 5:
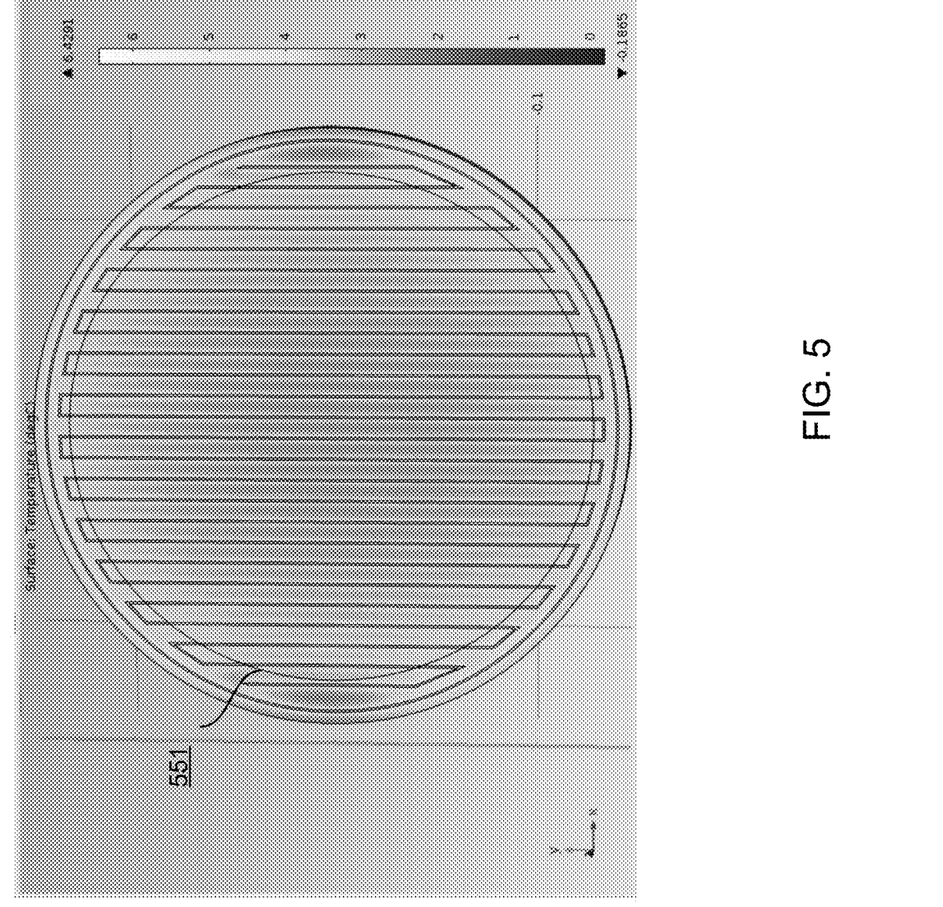
FIG. 5 is a heat map illustrating the surface temperature uniformity achieved by heating elements illustrated in FIG. 3, in accordance with an embodiment.

FIG. 5 is a heat map illustrating the surface temperature uniformity achieved by heating elements illustrated in FIG. 3, in accordance with an embodiment. FIG. 5 also illustrates the field of view 551 of the optical communication system. Although minor variations in temperature are still present across the field of view 551, they are within a threshold that results in less than a 1 dB transmission loss as compared to the transceiver system 100 without the heating elements applied to the window 102. In other words, the transmission loss due to the obscuration of the optical communication signal 112 due to the presence of the heating elements combined with the wavefront distortion caused by minor temperature variations across the field of view of the optical communication system protected on the window creates less than 1 dB transmission loss. The transmission loss also depends upon the heater power in Watts, with greater power leading to increased transmission loss, but under the operating conditions up to 60W, the transmission loss is controlled to remain below 1 dB.

Figure 6:
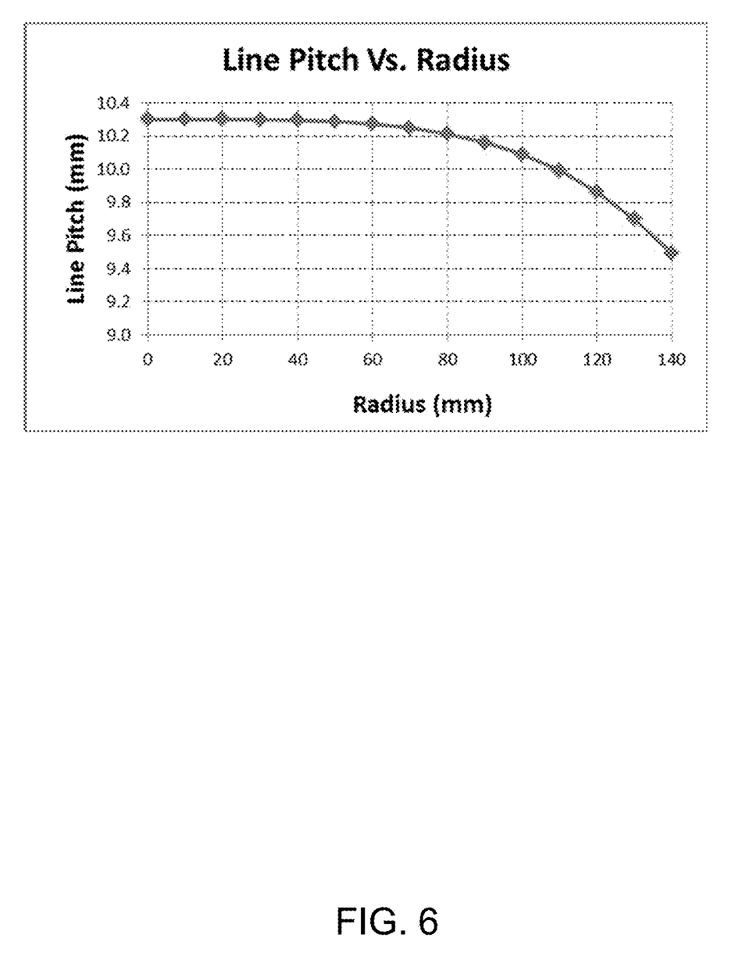
FIG. 6 is a graph illustrating line pitch as a function of radius from the center of a circular window, in accordance with an embodiment.

FIG. 6 is a graph illustrating line pitch as a function of radius from the center of a circular window, in accordance with an embodiment. At increasing distances from the center of the window, the lines are spaced closer together. This was derived from the following relationship that gives the pitch of a heating element from the previous one (i.e., the line closer to the center) as a function of radial distance:

$$p = p_0 - (p_0 - p_{min}) \left| \frac{r}{r_0} \right|^n \qquad \text{Eq. 2}$$

where $p_0$, $p_{min}$, $r_0$ and n are tuned in order to achieve a uniform temperature distribution. In one implementation, adequate values were found for $p_0$=10.3, $p_{min}$=9.5, $r_0$=139.7 and n=4.

Figure 7A:
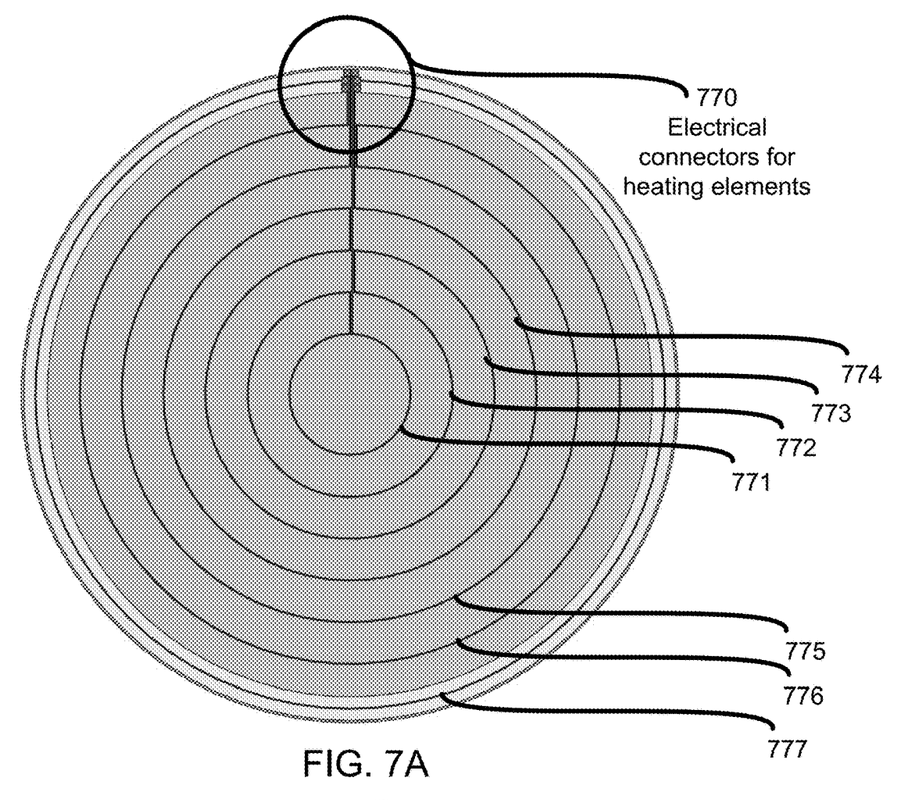
FIG. 7A illustrates an alternate design for the placement of heating elements, in accordance with an embodiment.
Figure 7B:
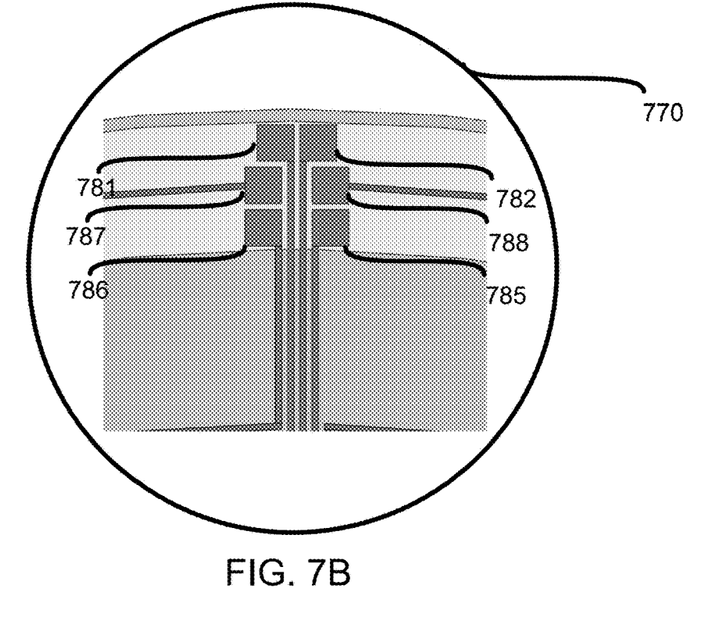
FIG. 7B illustrates the electrical connectors for the heating elements illustrated in FIG. 7A, in accordance with an embodiment.

FIG. 7A illustrates an alternate design for the placement of heating elements, in accordance with an embodiment. In this example, the heating elements are positioned to form concentric rings 771-777. FIG. 7B illustrates the electrical connectors 770 for the heating elements illustrated in FIG. 7A, in accordance with an embodiment. Connectors 781 and 782 are connected to rings 771-774. Connectors 785 and 786 are connected to rings 775 and 776. Connectors 787 and 788 are connected to ring 777. The pitch between the rings 771-777 can be configured to minimize temperature gradients across the window in order to minimize transmission loss by the transceiver system 100. In this example, at increasing distances from the center of the window, the rings are spaced closer together. Thus, the power density in relation to heat dissipation is balanced so that the heating elements substantially uniformly heat the window such that the window is kept free from condensation and ice without introducing significant distortions in the wavefront due to temperature gradients.

ADDITIONAL CONSIDERATIONS

The foregoing description of the embodiments has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. Accordingly, the disclosure of the embodiments is intended to be illustrative, but not limiting, of the scope of the invention, which is set forth in the following claims.

What is claimed is:

1. An optical communication system comprising:
   a free-space optical transceiver inside of a housing;
   a window in a side of the housing, the window having an interior surface nearest the transceiver and an opposite exterior surface, the window positioned in an optical pathway of the transceiver; and
   a plurality of heating element segments on the interior surface of the window,
   wherein at least two of the plurality of heating element segments adjacent to each other on the interior surface of the window comprise parallel line segments with varying pitch between them, the pitch decreasing with increasing distance from a point located at or near the center of the window, wherein the parallel line segments are connected by arc segments at ends of the parallel line segments to form one or more groups, each group comprising one contiguous heating element.

2. The optical communication system of claim 1, wherein the plurality of heating element segments substantially uniformly heats the window.

3. The optical communication system of claim 2, wherein the plurality of heating element segments causes less than 1 dB of transmission loss due to obscuration and temperature variations across a field of view of the optical communication system protected on the window.

4. The optical communication system of claim 1, wherein the window is round with a radius of approximately 140 millimeters and thickness of approximately 10 millimeters.

5. The optical communication system of claim 1, wherein the window comprises glass.

6. The optical communication system of claim 1, wherein the plurality of heating element segments comprises conductive epoxy.

7. The optical communication system of claim 6, wherein each of the plurality of heating element segments is on an order of magnitude 10 microns thick.

8. The optical communication system of claim 1, wherein the arc segments alternately connect the line segments at top and bottom ends of the parallel line segments.

9. The optical communication system of claim 1, further comprising a rim heater comprising a ring-shaped heating element.

10. The optical communication system of claim 9, wherein the rim heater is independently connected to a power supply in order to compensate for uncertainty in heat transfer between the window and the housing.

11. The optical communication system of claim 1, wherein the free-space optical transceiver operates at a wavelength of 1,550 nanometers.

12. The optical communication system of claim 1, wherein the free-space optical transceiver operates at an eye-safe wavelength.

13. The optical communication system of claim 1, wherein the optical communication system is installed outdoors.

14. An optical communication system comprising:
a free-space optical transceiver inside of a housing;
a window in a side of the housing, the window having an interior surface nearest the transceiver and an opposite exterior surface, the window positioned in an optical pathway of the transceiver; and
a plurality of heating element segments on the interior surface of the window,
wherein the plurality of heating element segments comprises concentric ring segments that are concentric about a point located at or near the center of the window,
wherein distances between adjacent concentric ring segments decrease with increasing distance from the point located at or near the center of the window, and
wherein the concentric ring segments are connected by arc segments at ends of the concentric ring segments to form one or more groups, each group comprising one contiguous heating element.

15. The optical communication system of claim 14, wherein the plurality of heating element segments substantially uniformly heats the window.

16. The optical communication system of claim 15, wherein the plurality of heating element segments causes less than 1 dB of transmission loss due to obscuration and temperature variations across a field of view of the optical communication system protected on the window.

17. The optical communication system of claim 14, wherein each of the plurality of heating element segments is on an order of magnitude 10 microns thick.

18. The optical communication system of claim 14, wherein the window is round with a radius of approximately 140 millimeters and thickness of approximately 10 millimeters.

19. The optical communication system of claim 14, further comprising a rim heater comprising a ring-shaped heating element, wherein the rim heater is independently connected to a power supply in order to compensate for uncertainty in heat transfer between the window and the housing.

* * * * *